US005842047A

United States Patent [19]

Ogura et al.

[11] Patent Number: 5,842,047

[45] Date of Patent: Nov. 24, 1998

[54] STROBE LIGHT AND PHOTOGRAPHIC CAMERA INCORPORATING THE SAME

[75] Inventors: Hisashi Ogura, Ikoma-gun; Katsumi Ogisako, Osaka, both of Japan

[73] Assignee: West Electric Company, Ltd., Osaka, Japan

[21] Appl. No.: 879,423

[22] Filed: Jun. 20, 1997

[30] Foreign Application Priority Data

Jun. 27, 1996 [JP] Japan .................................... 8-167026

[51] Int. Cl.[6] ..................................................... G03B 15/05

[52] U.S. Cl. .............................. 396/6; 396/176; 396/205; 315/241 P

[58] Field of Search ................................ 396/176, 6, 205, 396/206; 315/241 P

[56] References Cited

U.S. PATENT DOCUMENTS 4,900,990 2/1990 Sikora ................................ 315/241 P

*Primary Examiner*—W. B. Perkey
*Attorney, Agent, or Firm*—Sheridan Ross P.C.

[57] ABSTRACT

A strobe light which emits light by supplying a flash discharge tube with the electric charge stored in a main capacitor uses an aluminum-electrolytic capacitor having a dissipation factor (tanδ) of 0.03 or lower, and has voltage controlling means for setting the charge completion voltage of the aluminum-electrolytic capacitor at a predetermined value within 265±35 V.

3 Claims, 2 Drawing Sheets

STROBE LIGHT AND PHOTOGRAPHIC CAMERA INCORPORATING THE SAME

BACKGROUND OF THE INVENTION

The present invention relates to a strobe light used as an artificial light source in photographing and a photographic camera incorporating the strobe light, and more particularly, to a strobe light the price of which is reduced by improving the cost performance of an aluminum-electrolytic capacitor used as a main capacitor for storing electric energy (hereinafter, referred to as main capacitor) and a photographic camera incorporating the strobe light.

The basic structure of a conventional strobe light is briefly described below. The strobe light comprises a low voltage direct current source such as a dry cell, a direct current-direct current (DC-DC) converter circuit for increasing the voltage and a main capacitor. Another example of the strobe light comprises a high voltage direct current source having a layer-built cell, and a main capacitor. The main capacitor is typically charged to a constant high voltage of approximately 330 V in its charge completion state.

Then, the electric charge stored in the main capacitor is instantaneously discharged through a flash discharge tube so that the flash discharge tube emits subject-illuminating light having a wavelength distribution which is similar to that of sunlight.

When the high voltage direct current source has the DC-DC converter circuit, a well-known constant-voltage circuit is typically provided for controlling the operation of the DC-DC converter circuit so that the charge voltage of the main capacitor is kept to a predetermined value.

It is also known that a dimmer circuit is provided for controlling the amount of light emitted by the flash discharge tube when necessary.

In recent years, the strobe light as described above has been sold not only alone but also incorporated in various types of photographic cameras, for example, known single-use cameras the film of which cannot be changed and compact cameras.

Because of the lower prices of the single-use cameras and the compact cameras that result from market competition, it is required that the strobe light incorporated in those cameras should be further reduced in cost with the performance such as the light emission amount and specifications being maintained as they are.

For the strobe light incorporated in the single-use camera, the proportion of the cost of the strobe light is high in the cost of all the parts of the camera. In other words, if the cost of the strobe light is reduced, the cost of the single-use camera will greatly be reduced and this will produce a great cost reduction effect. For this reason, there is a strong demand for the cost reduction of the strobe light.

For example, examining the price per part of the strobe light incorporated in the single-use camera, the price of the main capacitor determining the characteristics of the strobe light accounts for approximately one-third of the price of all the parts of the strobe light. Therefore, in order to reduce the cost of the strobe light, it is effective to reduce the price of the main capacitor.

As the main capacitor, an aluminum-electrolytic capacitor is typically used. The aluminum-electrolytic capacitor has a rolled element formed by spirally rolling an anode aluminum foil and a cathode aluminum foil superimposed with electrolytic paper therebetween. The rolled element is impregnated with an electrolytic solution and placed in a container, and the container is sealed with rubber packing to complete the aluminum-electrolytic capacitor.

Examining the determinant of the price of the aluminum-electrolytic capacitor, the price of the electrode foils such as the anode aluminum foil accounts for approximately 70% of the price of the aluminum-electrolytic capacitor. Moreover, the higher the foil withstand voltage is, the higher the price of the electrode foil is. It is also known that the price of the foil increases in proportion to the area of the foil.

Therefore, in order to reduce the price of the main capacitor to thereby reduce the cost of the strobe light and the photographic camera incorporating the strobe light, it is considered to use an electrode foil having a low foil withstand voltage. It is also considered to reduce the area of the foil.

However, if the electrode foil having a low foil withstand voltage (i.e. break down voltage of foil) is used, an allowable charge voltage will naturally lowers, and if the area of the foil is reduced, the capacitance will naturally decrease.

Therefore, in the case where the performance such as the light emission amount and specifications of the strobe light are maintained as they are, for example, if energy expressed as $CV^2/2$ (C is the capacitance of the main capacitor, and V is the voltage) and applicable to the flash discharge tube is maintained as it is, in the case where the allowable charge voltage lowers, it is necessary to increase the capacitance C. In the case where the area of the foil is reduced, it is necessary to increase the working voltage V.

In other words, in the case that the allowable charge voltage lowers, for example, it is necessary to increase the area of the foil in order to increase the capacitance C. In the case that the area of the foil is reduced, for example, it is necessary to use an electrode foil having a high foil withstand voltage in order to increase the working voltage V.

Comparing now the cost reduction achieved by the reduction in foil withstand voltage or in foil area with the cost increase due to the increase in foil area or in foil withstand voltage caused by the reduction in foil withstand voltage or in foil area, the cost reduction is almost counterbalanced by the cost increase. It was confirmed that in some cases, the cost increase was greater than the cost reduction.

That is, a sufficient cost reduction effect cannot be expected only by reducing the foil withstand voltage or the foil area as described above. As a result, the cost reduction of the strobe light and the photographic camera incorporating the strobe light cannot sufficiently be realized.

BRIEF SUMMARY OF THE INVENTION

An object of the present invention is to provide a strobe light in which performance such as the light emission amount and specifications are maintained as they are by using as the main capacitor an inexpensive aluminum-electrolytic capacitor. The cost of which is reduced by selecting a dissipation factor (tanδ) of the aluminum-electrolytic capacitor to a predetermined value and below and controlling the charge completion voltage so as to be an appropriate value, and a photographic camera incorporating the strobe light.

A strobe light of the present invention uses as the main capacitor an aluminum-electrolytic capacitor having a dissipation factor (tanδ) of 0.03 or lower, and has voltage controlling means for controlling the charge completion voltage of the aluminum-electrolytic capacitor so as to be within 265±35 V.

DETAILED DESCRIPTION OF THE INVENTION

Figure 1:
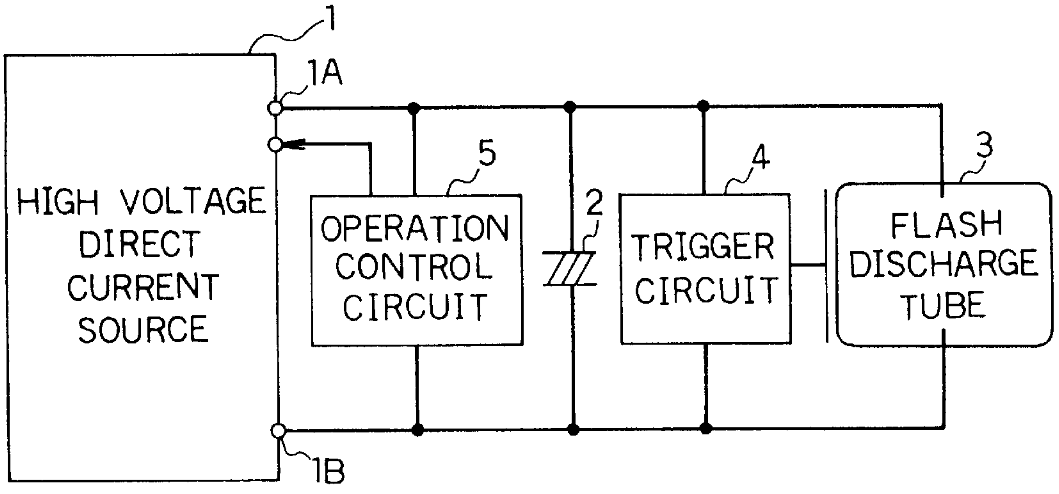
FIG. 1 is a circuit block diagram showing an embodiment of a strobe light according to the present invention.

FIG. 1 is an electric circuit diagram showing an embodiment of a strobe light according to the present invention.

Referring to FIG. 1, a high voltage direct current source 1 has a low voltage direct current source, for example, a dry cell, and a DC-DC converter circuit for increasing the voltage. As the high voltage direct current source 1, a high voltage layer-built cell may be used.

Between output terminals 1A and 1B of the high voltage direct current source 1, an aluminum-electrolytic capacitor 2 having a dissipation factor (tanδ) of 0.03 or lower and charged by the high voltage direct current source 1 is connected as the main capacitor. Across the aluminum-electrolytic capacitor 2, a flash discharge tube 3 is connected which emits illuminating light by consuming the electric charge stored in the aluminum-electrolytic capacitor 2.

Between the output terminals 1A and 1B of the high voltage direct current source 1, the following elements are further connected: a known trigger circuit 4 for exciting the flash discharge tube 3; and an operation control circuit 5 for controlling the output voltage of the high voltage direct current source 1 so that the charge completion voltage of the aluminum-electrolytic capacitor 2 is adjusted within 265±35 V.

The strobe light of the embodiment uses an aluminum-electrolytic capacitor 2 having a dissipation factor (tanδ) of 0.03 or lower. Moreover, the output voltage of the high voltage direct current source 1 is controlled by the operation control circuit 5 so that the charge completion voltage of the aluminum-electrolytic capacitor 2 is maintained within 265±35 V, for example, at 280 V.

Although not shown, it is needless to say that known light emission controlling means such as a so-called dimmer circuit may be provided for controlling the light emitting operation of the flash discharge tube 3 if necessary.

Next, an operation of the embodiment will be described. When the high voltage direct current source 1 is activated, the aluminum-electrolytic capacitor 2 is charged by the high direct current voltage generated across the output terminals 1A and 1B.

The operation of the high voltage direct current source 1 is controlled by the operation control circuit 5 so that the charge completion voltage of the aluminum-electrolytic capacitor 2 is a predetermined voltage within 265±35 V.

The trigger circuit 4 is activated when the charging of the aluminum-electrolytic capacitor 2 is completed, i.e. when the aluminum-electrolytic capacitor 2 is charged to a predetermined voltage within 265±35 V. The flash discharge tube 3 is excited by the operation of the trigger circuit 4 and emits illuminating light by consuming the electric charge stored in the aluminum-electrolytic capacitor 2.

In the case that the light emission controlling means is provided for controlling the light emitting operation of the flash discharge tube 3, for example, the amount of illuminating light emitted by the flash discharge tube 3 is controlled when necessary.

The basics of the above-described light emitting operation of the strobe light according to the embodiment are the same as those of known strobe lights.

Next, the dissipation factor (tanδ) and the charge completion voltage of the aluminum-electrolytic capacitor 2 of the embodiment will be described.

Figure 2:
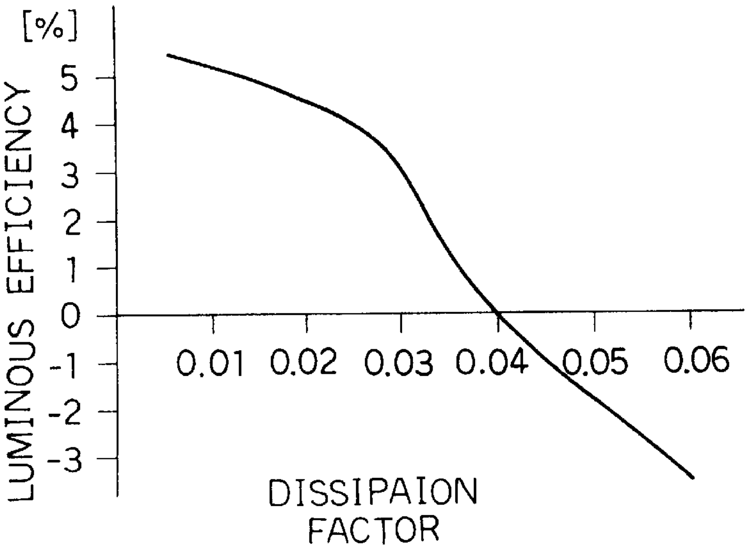
FIG. 2 is a dissipation factor (tanδ)-luminous efficiency characteristic view showing, with a dissipation factor (tanδ) of 0.04 as the reference, a relationship between the dissipation factor (tanδ) and the luminous efficiency when a plurality of aluminum-electrolytic capacitors having the same capacitance but different dissipation factors (tanδ) are charged at 280 V to cause a flash discharge tube to emit light.

FIG. 2 is a dissipation factor (tanδ)-luminous efficiency characteristic view showing a relationship between the dissipation factor (tanδ) and the rate of increase in luminous efficiency measured when a plurality of aluminum-electrolytic capacitors having the same capacitance but different dissipation factors (tanδ) are charged to a charge completion voltage of 280 V to cause a predetermined flash discharge tube to emit light. The luminous efficiency is expressed as the proportion of the charge energy of the aluminum-electrolytic capacitor which is converted into the luminous energy of visual light in the strobe light. In FIG. 2, abscissa represents the dissipation factor (tanδ) and ordinate represents the increase rate of the luminous efficiency, and the increase rate of the luminous efficiency when the dissipation factor (tanδ) is 0.04 which is the dissipation factor (tanδ) of the conventional standard aluminum-electrolytic capacitors is shown as zero. From FIG. 2, it is apparent that the luminous efficiency increases as the dissipation factor (tanδ) decreases. A similar measurement was carried out with various different capacitances and charge voltages, and a dissipation factor (tanδ)-luminous efficiency characteristic similar to that of FIG. 2 was obtained and it was confirmed that the luminous efficiency increased as the dissipation factor (tanδ) decreased.

Specifically, with the dissipation factor (tanδ) of 0.04 as the reference, when the dissipation factor (tanδ) is 0.03, the luminous efficiency increases by approximately 3.5%. When the dissipation factor (tanδ) is 0.025, the luminous efficiency increases by approximately 4%.

According to the results, when an aluminum-electrolytic capacitor is used which has a dissipation factor (tanδ) of 0.03 or lower, the luminous efficiency increases by 3.5% or more. When an aluminum-electrolytic capacitor is used which has a dissipation factor (tanδ) of 0.025 or lower, the luminous efficiency increases by 4% or more.

Considering reasons therefor, the aluminum-electrolytic capacitor having a small dissipation factor (tanδ) has a low internal resistance. Therefore, it is considered that the reason why the use of an aluminum-electrolytic capacitor having a small dissipation factor (tanδ) increases the luminous efficiency is that the charge energy is efficiently supplied to the flash discharge tube because the power loss due to the internal resistance is small.

The aluminum-electrolytic capacitor having a dissipation factor (tanδ) of 0.03 or lower is easily obtained by controlling the conductivity of the electrolytic solution which is impregnated in the electrolytic paper interposed between the anode aluminum foil and the cathode aluminum foil. Specifically, the dissipation factor (tanδ) decreases as the conductivity of the electrolytic solution increases.

According to FIG. 2, a dissipation factor (tanδ) of 0.01 or lower is more advantageous because the luminous efficiency increases by 5% or more. However, an experiment by the inventor revealed that if the conductivity of the electrolytic solution was increased too much in order to decrease the dissipation factor (tanδ), the electrolytic solution deteriorates due to the repeatedly-performed charging and discharging during the light emitting operation of the strobe light and the dissipation factor (tanδ) gradually increases because of the deterioration.

For example, in a strobe light using an aluminum-electrolytic capacitor where the conductivity of the electrolytic solution is increased so that the dissipation factor (tanδ) is 0.01, when the light emitting operation is repeated, the dissipation factor (tanδ) successively increases, for example, to 0.02 and then to 0.03 because of the deterioration of the electrolytic solution.

Therefore, even if the dissipation factor (tanδ) is initially set at 0.01, it is difficult to maintain the dissipation factor (tanδ) 0.01 while the light emission operation is performed a number of times. Thus, it was confirmed that increasing the conductivity of the electrolytic solution was defective in maintenance characteristic because it was difficult to maintain the initially-obtained effect.

Therefore, when an aluminum-electrolytic capacitor is used in which the dissipation factor (tanδ) is set at a particularly small value such as 0.01, it is necessary to give sufficient consideration to the dissipation factor (tanδ) maintenance characteristic. For example, in the case of the single-use camera where the light emitting operation is performed only a small number of times, such an aluminum-electrolytic capacitor having the dissipation factor (tanδ) of 0.01 can be used as the main capacitor of the strobe light incorporated therein.

Figure 3:
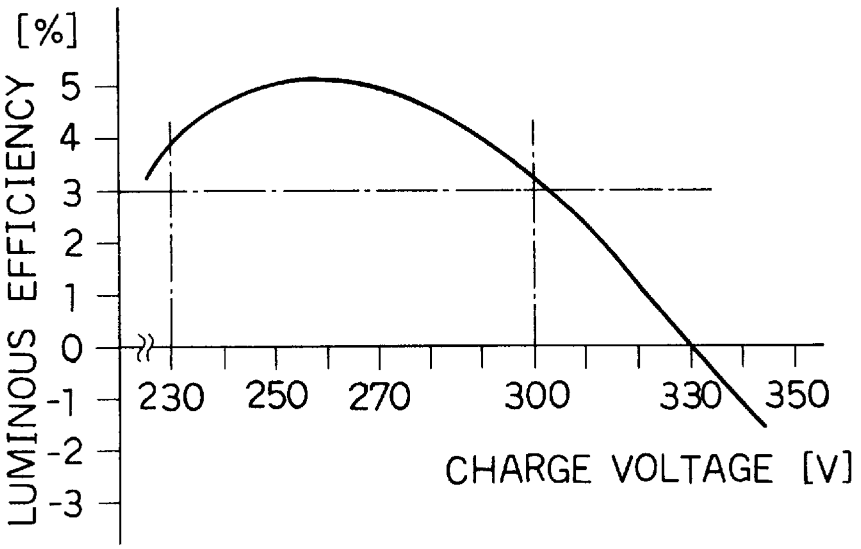
FIG. 3 is a charge voltage-luminous efficiency characteristic view showing, with a charge voltage of 330 V as the reference, a relationship between the charge voltage and the luminous efficiency when the flash discharge tube is caused to emit light with the input energy being constant.

In FIG. 3, abscissa represents the charge voltage (charge completion voltage) and ordinate represents the luminous efficiency. FIG. 3 is a charge voltage-luminous efficiency characteristic view showing a relationship between the charge voltage and the increase rate of the luminous efficiency of the aluminum-electrolytic capacitor when the flash discharge tube is caused to emit light with a constant input energy. With the charge voltage of 330 V for conventional typical strobe lights as the reference, the increase rate of the luminous efficiency when the charge voltage is 330 V is shown as zero.

According to the charge voltage-luminous efficiency characteristic view shown in FIG. 3, the luminous efficiency is greatest when the charge voltage is approximately 255 V, and decreases as the charge voltage increases or decreases from 255 V.

When the charge voltage is within 265±35 V, the luminous efficiency increases by 3% to 5%. Therefore, by setting the charge voltage within 265±35 V, the luminous efficiency is increased by 3% to 5% compared with the conventional strobe lights having a charge voltage of 330 V.

The inventor examined the relationship between the charge voltage and the luminous efficiency with various different capacitances and flash discharge tubes. As a result of the examination, it was confirmed that charge voltage-luminous efficiency characteristics showing a tendency similar to that of FIG. 3 were obtained although the charge voltage at which the peak value of the luminous efficiency was varied within 255±5 V.

The reason that the luminous efficiency is greatest at a charge voltage of approximately 255 V will be described below. The inventor confirmed that the proportion of infrared light or ultraviolet light in the light emitted by the flash discharge tube decreased as the charge voltage decreased in the strobe light. It is considered the reason therefor is that when the charge voltage decreases, the energy used for the emission of infrared or ultraviolet light decreases, so that the energy used for the emission of visible light relatively increases. Infrared light and ultraviolet light do not contribute to the illumination for photographing. The inventor's confirmation was obtained through the following measurement: The same flash discharge tube was caused to emit light at three different charge voltages of 330 V, 300 V and 240 V, and the spectral distributions at the respective charge voltages were examined. The results are shown in FIG. 4.

Figure 4:
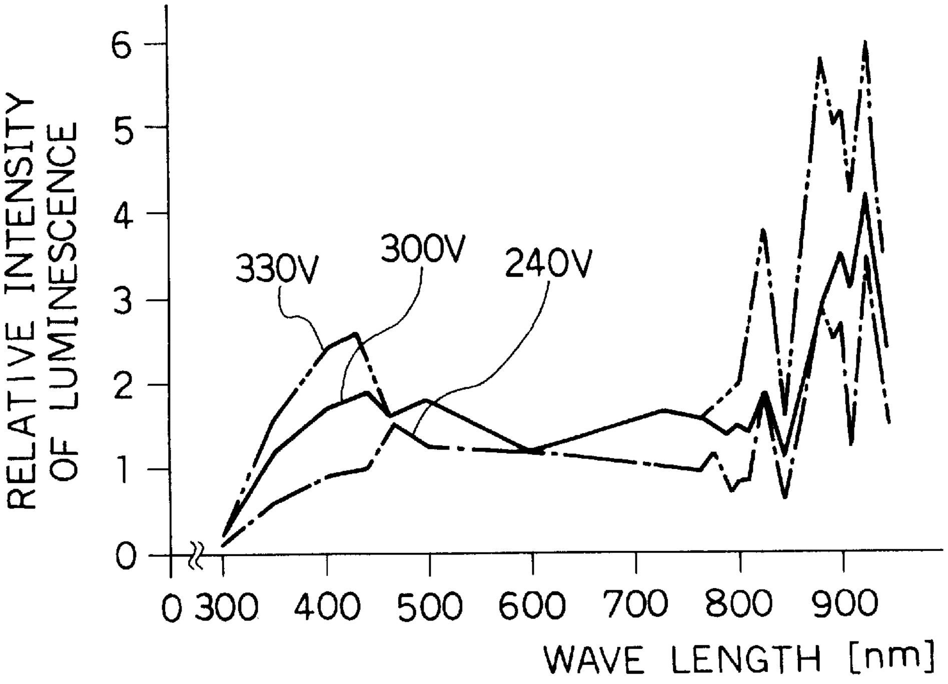
FIG. 4 is a spectral distribution characteristic view schematically showing the spectral distribution obtained when the flash discharge tube is caused to emit light at three different charge voltages of 330 V, 300 V and 240 V.

In the graph of FIG. 4, with the charge voltage as the parameter, abscissa represents the wavelength of the light and ordinate represents the relative intensity of luminescence. In the figure, comparing the spectral distributions at the charge voltages of 240 V, 300 V and 330 V, in the infrared region with wavelengths of 750 nm or greater, the relative intensity of luminescence increases as the charge voltage increases. In the visible region with wavelengths of 400 nm to 750 nm, the relative intensities of luminescence at the charge voltages of 300 V and 330 V are substantially the same and the intensity at the charge voltage of 240 V is somewhat low. In the ultraviolet region with wavelengths of 400 nm or shorter, the relative intensity of luminescence increases as the charge voltage increases. Thus, when the charge voltage is 300 V or higher, the relative intensity of luminescence of infrared light and ultraviolet light is high compared with the case of the charge voltage of 240 V. Therefore, the luminous efficiency decreases which is represented by the luminous energy of visible light.

In FIG. 3, as for the luminous efficiency, an excellent characteristic is obtained even when the charge completion voltage is 230 V or lower. However, when the charge completion voltage is 230 V or lower, the characteristics of the strobe light are affected by the characteristics of the flash discharge tube.

In the strobe light, a charge voltage lower than the charge completion voltage by several tens of volts is set as the operation ensuring voltage. Therefore, when the charge completion voltage is 230 V or lower, it is considered that the operation ensuring voltage decreases to 180 V or lower.

The minimum voltage at which the flash discharge tube can emit light with stability is comparatively high. For this reason, it is considered difficult to perform the light emitting operation with stability at the voltage of 180 V or lower. Therefore, it is questionable to reduce the charge completion voltage in consideration of only the luminous efficiency. For this reason, in the present invention, the charge completion voltage is controlled so as to be within 265±35 V as mentioned previously.

As described above, in the strobe light of the embodiment, the luminous efficiency is improved by using the aluminum-electrolytic capacitor 2 having a dissipation factor (tanδ) of 0.03 or lower and setting the charge completion voltage of the aluminum-electrolytic capacitor 2 within 265±35 V.

Consequently, viewing the strobe light of the embodiment from the view point of cost reduction, since the charge completion voltage of the aluminum-electrolytic capacitor is reduced from the conventional value of approximately 330 V to a value within 265±35 V, an inexpensive electrode foil may be used which has a low foil withstand voltage, so that the cost is reduced in this regard.

When the charge completion voltage is reduced, as described previously, in order to obtain performance and specifications similar to those before the voltage is reduced, it is necessary to increase the foil area. Because of the cost increase due to the increase in foil area, it is considered that the cost reduction might not sufficiently be achieved in the strobe light of the embodiment.

However, in the strobe light of the embodiment, the luminous efficiency is improved as mentioned above by reducing the charge completion voltage of the aluminum-electrolytic capacitor and setting the dissipation factor (tanδ) thereof at 0.03 or lower.

Consequently, the energy applied to the flash discharge tube is reduced which energy is expressed as $CV^2/2$ and necessary for obtaining the same light emission amount as that of the conventional strobe lights.

In other words, since the luminous efficiency improves, a similar light emission amount is obtained with a lower applied energy than in the conventional strobe lights. Consequently, the rate of the increase in foil area necessitated by the reduction in charge voltage due to the reduction in foil withstand voltage is small compared with the case in which the luminous efficiency is not improved. As a result, the cost increase due to the increase in foil area is suppressed.

That is, in a conventional strobe light using an aluminum-electrolytic capacitor with a charge completion voltage of approximately 330 V and a dissipation factor (tanδ) in the vicinity of 0.04, the charge voltage reduces as the foil withstand voltage decreases. In the strobe light of the embodiment, the performance and specifications before the charge voltage is reduced are realizable by increasing the foil area by a smaller amount than the amount necessary to compensate for the reduction in charge voltage in the conventional strobe lights.

Consequently, the cost increase due to the increase in foil area is reduced, so that the cost is sufficiently reduced by reducing the foil withstand voltage.

In other words, in the strobe light of the embodiment, the price of the aluminum-electrolytic capacitor which accounts for approximately one-third the price of all the parts of the strobe light is lower not only than the price of the conventional main capacitor with a high foil withstand voltage but also than the price of a main capacitor in which the foil withstand voltage is reduced without the luminous efficiency being improved. Consequently, the cost reduction of the strobe light using the aluminum-electrolytic capacitor is realized.

When the strobe light of the embodiment is incorporated in a photographic camera, the cost of the photographic camera is reduced by the cost reduction of the strobe light incorporated therein.

As described above, according to the strobe light of the embodiment and the photographic camera incorporating the strobe light, the price of the aluminum-electrolytic capacitor as the main capacitor for storing electric energy is reduced by improving the luminous efficiency by setting and controlling the dissipation factor (tanδ) and the charge completion voltage of the aluminum-electrolytic capacitor so as to be appropriate values. As a result, the cost reduction of the strobe light is achieved.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A strobe light comprising:

an aluminum-electrolytic capacitor as a main capacitor for storing electric energy having a dissipation factor (tanδ) of at most 0.03; and operation controlling means for controlling a charge completion voltage of the aluminum-electrolytic capacitor so as to be at most 300 V.

2. A strobe light comprising:

a power source for supplying direct current;

an aluminum-electrolytic capacitor connected to the power source for charging, said aluminum-electrolytic capacitor having a dissipation factor (tanδ) of at most 0.03;

operation controlling means for controlling the power source so that a charge completion voltage of the aluminum-electrolytic capacitor is a predetermined value within 265±35 V; and a flash discharge tube for emitting light by discharging an electric charge stored in the aluminum-electrolytic capacitor.

3. A photographic camera incorporating strobe light, said strobe light comprising:

a power source for supplying direct current;

an aluminum-electrolytic capacitor connected to the power source for charging, said aluminum-electrolytic capacitor having a dissipation factor (tanδ) of at most 0.03;

operation controlling means for controlling the power source so that a charge completion voltage of the aluminum-electrolytic capacitor is a predetermined value within 265±35 V; and a flash discharge tube for emitting light by discharging an electric charge stored in the aluminum-electrolytic capacitor.

* * * * *